(12) United States Patent
Kanevsky et al.

(10) Patent No.: US 6,426,761 B1
(45) Date of Patent: Jul. 30, 2002

(54) INFORMATION PRESENTATION SYSTEM FOR A GRAPHICAL USER INTERFACE

(75) Inventors: Dimitri Kanevsky, Ossining; Clifford A. Pickover; Alexander Zlatsin, both of Yorktown Heights, all of NY (US)

(73) Assignee: Internation Business Machines Corporation, Armonk, NY (US)

( * ) Notice: Subject to any disclaimer, the term of this patent is extended or adjusted under 35 U.S.C. 154(b) by 0 days.

(21) Appl. No.: 09/298,016

(22) Filed: Apr. 23, 1999

(51) Int. Cl.[7] .................................................. G06F 3/00
(52) U.S. Cl. ........................................ 345/788; 345/764
(58) Field of Search .................................. 345/762, 765, 345/744, 788, 764, 835, 968, 775, 839, 854

(56) References Cited

U.S. PATENT DOCUMENTS

| | | | |
|---|---|---|---|
| 6,112,186 A | * | 8/2000 | Bergh et al. ................... 705/10 |
| 6,188,405 B1 | * | 2/2001 | Czerwinski et al. ......... 345/764 |
| 6,262,597 B1 | * | 6/2001 | Lokuge ......................... 345/841 |

* cited by examiner

Primary Examiner—Cao H. Nguyen
(74) Attorney, Agent, or Firm—Scully, Scott, Murphy & Presser; Daniel P. Morris, Esq.

(57) ABSTRACT

Information presentation system comprises a computer device having a display terminal for providing a graphical user interface (GUI), capable of generating a cluster of items comprising graphical or textual elements for display thereof according to a fractal appearance. Each item in a cluster represents information having a degree of relatedness with information represented by other items in a cluster. A control mechanism is provided for controlling the spatial extent, nesting and arrangement of items within a cluster according to a specified criteria, which spatial extent and arrangement is controlled to provide optimal display and conserve screen display space on the display terminal. Users may manually enter a criteria for organizing and adjusting the spatial extent of a cluster in order to provide continuous display space on the computer display terminal. The invention may be implemented in text editors to provide a multiresolution annotation feature for portable and lap/palm-top computer devices having pen-based or keyboard based inputs.

48 Claims, 8 Drawing Sheets

INFORMATION PRESENTATION SYSTEM FOR A GRAPHICAL USER INTERFACE

BACKGROUND OF THE INVENTION

1. Field of the Invention

The present invention relates to computer graphical user interfaces (GUIs) and, more specifically, to a system for generating a graphical user interface for computer desktops, text editors, web browsers, and the like, that organizes graphical, textual, pull-down menus, desktop and webtop elements as a spacial cluster having an appearance and which may be organized and condensed in size according to user-specified or system-generated criteria.

2. Discussion of the Prior Art

Graphical user interfaces for computer systems such as the Microsoft's Windows 95/98® desktop typically comprise a plurality of icons or graphical elements configured for presentation on a user display terminal. Each of these icons are of a predetermined size, and selectable, for instance, by a mouse click, and represents a shortcut or agent for activating the selected program, for example, a database, text editor, an operating system utility, web browser program, etc. Additionally, a screen display accommodates pop-ups of windows, text, tool bars, and other information, with no regard as to the space limitations of the GUI.

The limitation of display space on a typical user screen presents a problem given the ever increasing amount of programs that are available for all kinds of computer users. Although windows themselves are collapsible to a small icon-size tab, they still take up space on the display screen.

It would be highly desirable to provide a graphically user interface and system for generating GUI displays that provides a means for visually and spatially consolidating and organizing related functions, data, text, programs and other information represented by graphical elements, as clusters having a fractal appearance, in a manner so as to conserve computer screen desktop space.

It would further be highly desirable to provide a graphically user interface and system for generating GUT displays that automatically organizes, nests, and clusters icons, windows, web links, and text according to user-specified criteria, and in a manner so that relatedness of information represented by items in the cluster may be easily understood.

Moreover, as computer and computing devices having pen inputs for writing on touch-sensitive screens are becoming increasingly common, like the CrossPad manufactured by A.T. Cross Company, it would be desirable to provide a system that may be used for organizing and annotating documents on pen-based computers.

SUMMARY OF THE INVENTION

It is an object of the present invention to provide a graphical user interface (GUI) and system for generating a computer GUI that automatically organizes, nests, and clusters related desktop elements, such as windows, textual and graphical elements (such as icons), for display according to a fractal appearance, so that computer desktop display space may be conserved.

It is another object of the invention to provide a web browser GUI implementing a system for automatically organizing and displaying related webtop display elements, e.g., text, web-page links, in clusters, for display according to a fractal appearance so that web browser's display space may be conserved.

It is a further object of the invention to provide a GUI for a text editor and other types of editors that displays textual information according to a fractal appearance so that portions of the editor's display area may be magnified in order to browse, organize and annotate clusters of text and diagrams displayed at different size scales.

It is yet another object of the invention to provide an improved system and method for organizing, displaying, managing, and selecting icons, text, images, graphics, and/or windows on a computer graphical interface, wherein the management, organization, and display is automatically performed according to user-defined criteria.

It is yet a further object of the invention to provide a system and method for automatically controlling the spatial distribution of clusters of items displayed on a computer display GUI, which spatial distribution is utilized to suggest relatedness of information represented by items within a cluster.

The use of fractal icons, windows and web links provide a means for visually and spatially consolidating and organizing related functions, data, text, programs and other information represented by graphical elements. With fractal icons, windows, web links, and text, the user never runs out of space on a computer-screen desktop, web browser window, or document (text) editor window.

Thus, according to the principle of the invention, there is provided an information presentation system comprising: a computer system including display terminal for providing graphical user interface (GUI); a means for generating a cluster of items comprising graphical or textual elements for display via said GUI, each item in a cluster representing information having a degree of relatedness with information represented by other items in said cluster; and a means for controlling the spatial extent of and arrangement of items within a cluster according to a specified criteria, which spatial extent and arrangement is controlled to provide optimal display and conserve screen display space on said display terminal. Preferably, the cluster of items is arranged according to a fractal appearance. Besides controlling the spatial extent of a fractal cluster, the nesting of items within and/or arrangement of items within the cluster may be controlled to suggest relations of items on the display terminal.

A primary advantage of the inventive system for presenting fractal item arrangements over the prior art is that the user never runs out of desktop space. Smaller and smaller items may be generated as needed and may remain in the vicinity of other related items. Thus, the system automatically changes the spatial extent of, nesting within, and/or arrangement of items within the cluster, in order to permit efficient use of available display space and/or enhanced viewability. A second advantage is that the user may quickly cluster items in space and understand relationships between items in a cluster. A third advantage is that a single parameter may be used to control and characterize the spatial arrangement of items such as: icons, windows, web links and text.

Advantageously, the system may be implemented to form annotations in a kind of "multiresolution" document comprised as part of novel portable or pervasive computers with pen, stylus, touch, speech, or keyboard inputs. In these systems multiresolution annotation may be performed with pen, stylus, touch, speech, or keyboard inputs.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS OF THE INVENTION

The present invention is a method and apparatus for generating GUIs for a variety of "desktop" and web browser applications that implements fractal geometries for organizing items such as icons, windows, pull-down menus, text and any other graphically represented information. For instance, additional graphical objects that may be organized include icons with static or animated graphics, multimedia presentations, and windows displaying TV broadcasts. GUI objects could also include three dimensional images, for example, those used in virtual reality applications. Users may also use the invention to organize desktop "shortcuts" which may represent programs, data files, links to web pages, etc and are usually represented by icons on the desktop GUI that permit fast access to programs or web site links. Shortcuts to web pages may be created by dragging a link from the web browser to a location on the desktop GUI. If the user clicks on these iconic shortcuts, the web browser is invoked, and the page of information corresponding to the link represented by the shortcut is displayed in the browser.

Figure 1A:
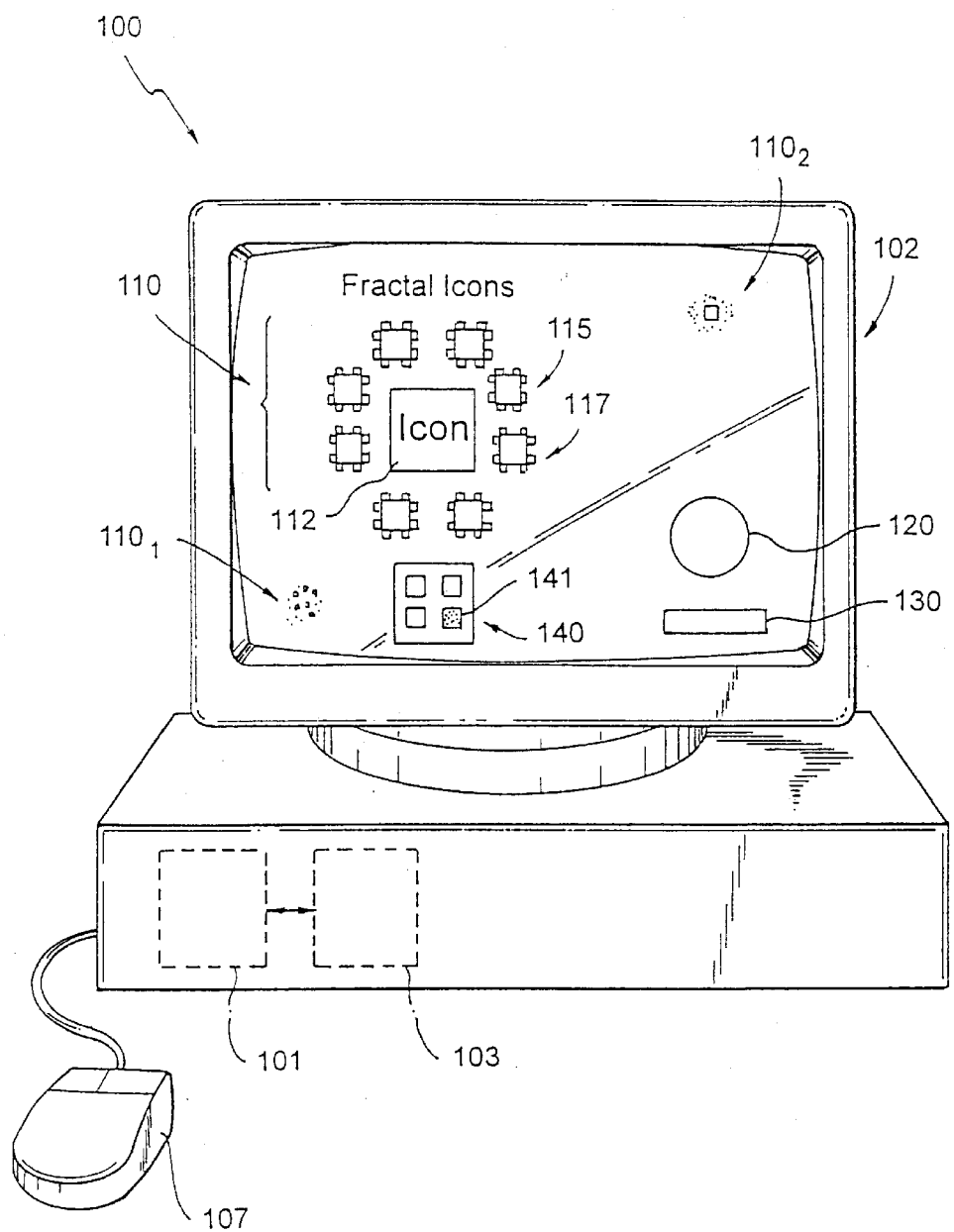
FIG. 1(a) depicts the novel computer desktop and information presentation system comprising a cluster of icons and sub-icons having a fractal appearance.

FIG. 1(a) illustrates the information presentation system 100 of the invention which comprises the generation of a novel computer monitor or display terminal 102 presenting a desktop of information in the form of one or more interrelated clusters 110 of icons and sub-icons having a fractal appearance. Each icon of a cluster may comprise either text, data, web-links, and programs or other information represented by graphical elements. On the computer's desktop 102, the GUI presents a fractal icon and/or window arrangements comprising a cluster 110 of one or more icons and sub-icons at varying sizes. Fractals provide a useful way to organize and represent sets of displayed items such as icons 110 because fractals often have a self-similar, attractive, easily-recognized structure that is conveniently manipulated, specified, and stored. The term "self-similar" implies that a fractal has similar-looking and similarly-organized graphical elements at many size scales so that when a part is magnified it resembles the whole structure. Although fractals are often quite regular and symmetrical in appearance, they may also have a more irregular or random appearance, if desired.

As shown in FIG. 1(a), fractal icon clusters 110, $110_1$, $110_2$, (with all their sub-icons), for example, are shown as varying sizes, which, as will be explained, may be generated automatically according to pre-defined criteria, a user-specified criteria, or, as a dynamically changing criteria. Each cluster, for example, may comprise a normal-sized central icon 112 generated according to a screen display resolution, e.g., as on any conventional desktop GUI such as presented by Microsoft's Windows 95/98 operating system, and may comprise other icons 115 in diminishing sizes for display in close proximity with the central icon 112. For example, as shown in FIG. 1(a), a plurality of sub-icons 115 may surround the larger icon 112, with sub-sub-icons 117 surrounding each sub-icon 115, etc. The spatial clustering 110 of a central icon 112 and other various nearby icons 115, 117 in diminishing sizes is intended to suggest to a user a degree or nature of relatedness for the set of nearby icons. For example, all icons in one cluster, e.g., cluster 110, may represent system programs and all icons in another cluster, e.g., cluster $110_1$, may represent editing programs.

According to the invention, the computer system 100 determines icon size and nesting based on several parameters. As understood, nesting refers to the nature and number of icons at different size scales within a cluster. For example, an icon might have four surrounding sub-icons each of which in turn have four surrounding sub-icons, each of which have four surrounding sub-icons and so on for 10 different size scales. A denser, or more complex, nesting requires the replacement of "four" sub-icons with "sixteen" sub-icons, for example. The concept of fractal dimension is related to this nesting in the sense that a cluster that densely fills space has a higher fractal dimension than a cluster that is sparse. In a preferred embodiment, the icon size, brightness and nesting determination may be based on the creation date, hierarchy, frequency of use, size of information represented by the icon, relations between information represented by items such as icons or links, or other parameter—or, the size may be entirely determined by the user's preference and manual manipulation with mouse. For example, a user may wish to place (or have the system automatically place) more frequently used icons in a central position with larger size. Less used programs (represented by icons) may be positioned surrounding the central icon at smaller sizes. As another example, a user may drag an icon representing a CAD program to one region of the desktop and surround it with tiny icons representing data files used by the CAD program.

According to the invention, a user may also wish to control, or have automatically controlled, the nature of nesting and fractal dimension. For example, less-used icons might be added to (or already reside in) a cluster with a high-fractal dimension and nesting because a user is less likely to have the need to navigate this cluster and therefore is willing to sacrifice graphical simplicity to save screen real estate.

Figure 1B:
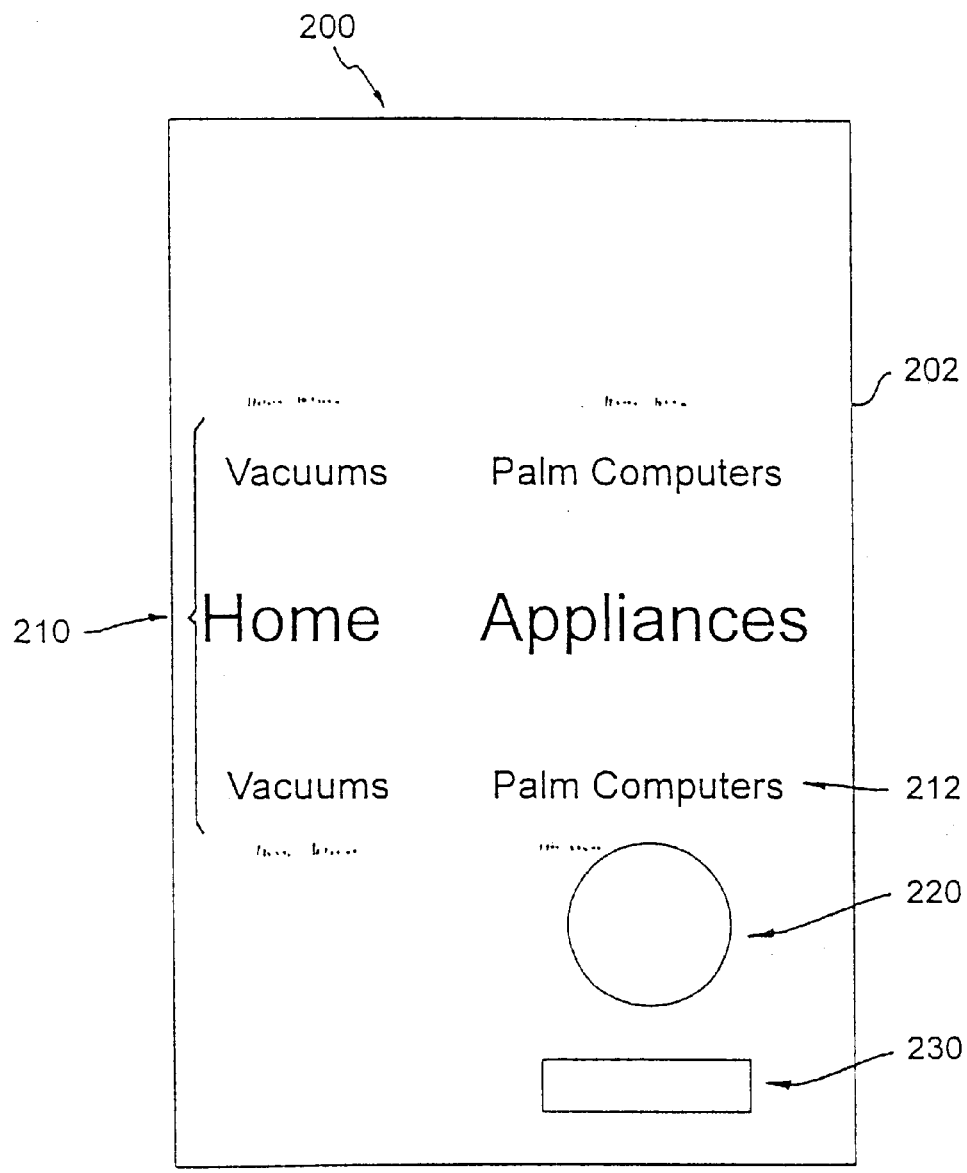
FIG. 1(b) depicts the novel computer web-top presentation system comprising a cluster of web-page links of various sizes having a fractal appearance.
Figure 2:
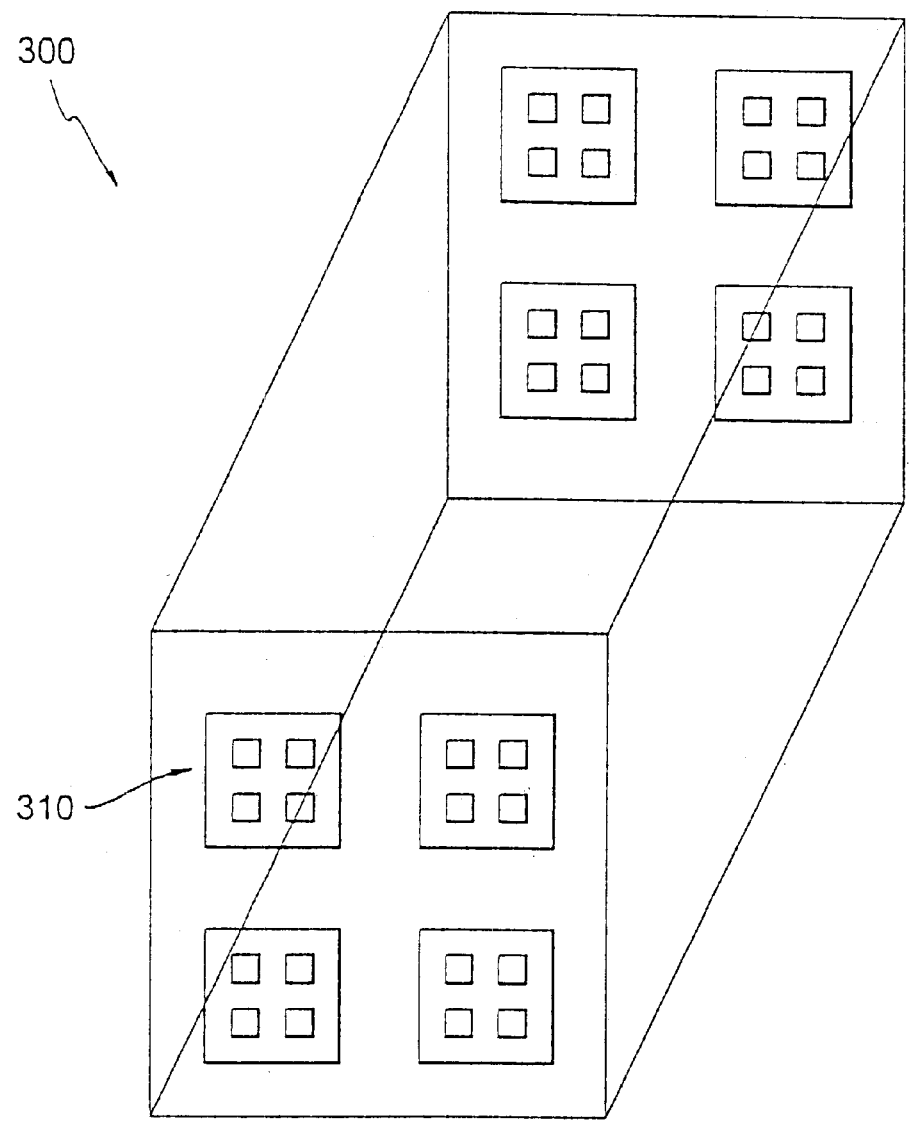
FIG. 2 is a three dimensional depiction of a fractal icon cluster.

It should be understood that the fractal appearance for an icon cluster is not limited to a central larger icon with surrounding smaller sub-icons, but may take on a more random cluster appearance or, alternatively, a more organized appearance, such as icons provided in a circle or elliptical structure, icons in tree-like structure, and icons in 3-D clusters with bounding regions of various shapes (e.g. pyramid, cube, tetrahedron, etc.). Additionally, it should be understood that the concepts presented herein relating to a desktop appearance, equally apply to the appearance of web-page links on a web-browser ("web-top") display. Thus, as shown in the example web-top GUI 200 of FIG. 1(*b*), there is illustrated example web-page 202 having a cluster 210 of web links 212 presented at different size scales in the web browser and having a fractal appearance. Furthermore, in accordance with the invention, fractal clusters may be applied to 3-D GUIs, such as in virtual reality systems. Thus, as shown in FIG. 2, the system may generate for presentation an arrangement 300 of fractal icon clusters 310 in 3-D space.

In order to access and see smaller icons of a fractal icon cluster 110, 210, 310 a user may manually magnify or zoom in on regions of the desktop using a variety of means such as by dragging a mouse device cursor (not shown) over the region to be magnified. Alternatively, a magnifier icon such as icon 120, 220 shown in FIGS. 1(*a*) and 1(*b*), respectively, may be dragged over a region of the fractal icon cluster 110, 210 to reveal smaller icons. The degree of magnification may be specified by numeric, mouse-gestural, graphical slider, speech input, or other means (not shown), with the degree of icon nesting being as deep as desired. The computer may also automatically enlarge sub-icons, sub-sub-icons based on predicted needs of the user or by some other criteria, as will be explained in greater detail.

The fractal icon clusters and arrangements according to the invention provides users with continuous desk-top/web-top space that is always conserved. That is, smaller and smaller icons may be used as needed and remain in the vicinity of one another, thus making room for more clusters or icons on the display. Specifically, the density and degree to which the icons (including sub-icons, sub-sub-icons, etc.) change size relative to the larger icons may be controlled by a fractal dimension parameter which is a mathematical variable that characterizes the packing and arrangement of the icons. For example, a high fractal dimension implies a denser, more highly compacted nesting of icons in a cluster, while a low fractal dimension would visually appear as a diffuse collection of icons. Preferably, the computer operating system automatically adjusts this parameter, as needed to conserve space (i.e. screen real estate), suggest relations of items in a cluster to the user, or improve user interaction. For example, as mentioned, less-used icons reside in a cluster with a high-fractal dimension and nesting because a user is less likely to need to navigate this cluster and therefore is willing to sacrifice graphical simplicity to save screen real estate. The system automatically detects that all the icons in a cluster have not been used in a month, for example, and will automatically repack them. Similarly, an often-used cluster may "spread out" (e.g., decrease the fractal dimension of the set of center points of each icon, thereby allowing the individual icons to be larger) so that a user may more easily navigate and magnify regions of interest. Other parameters representing a measure or degree of fractal cluster spatial distribution include: density, radius of gyration, standard deviation, etc.

Figures 3A, 3B:
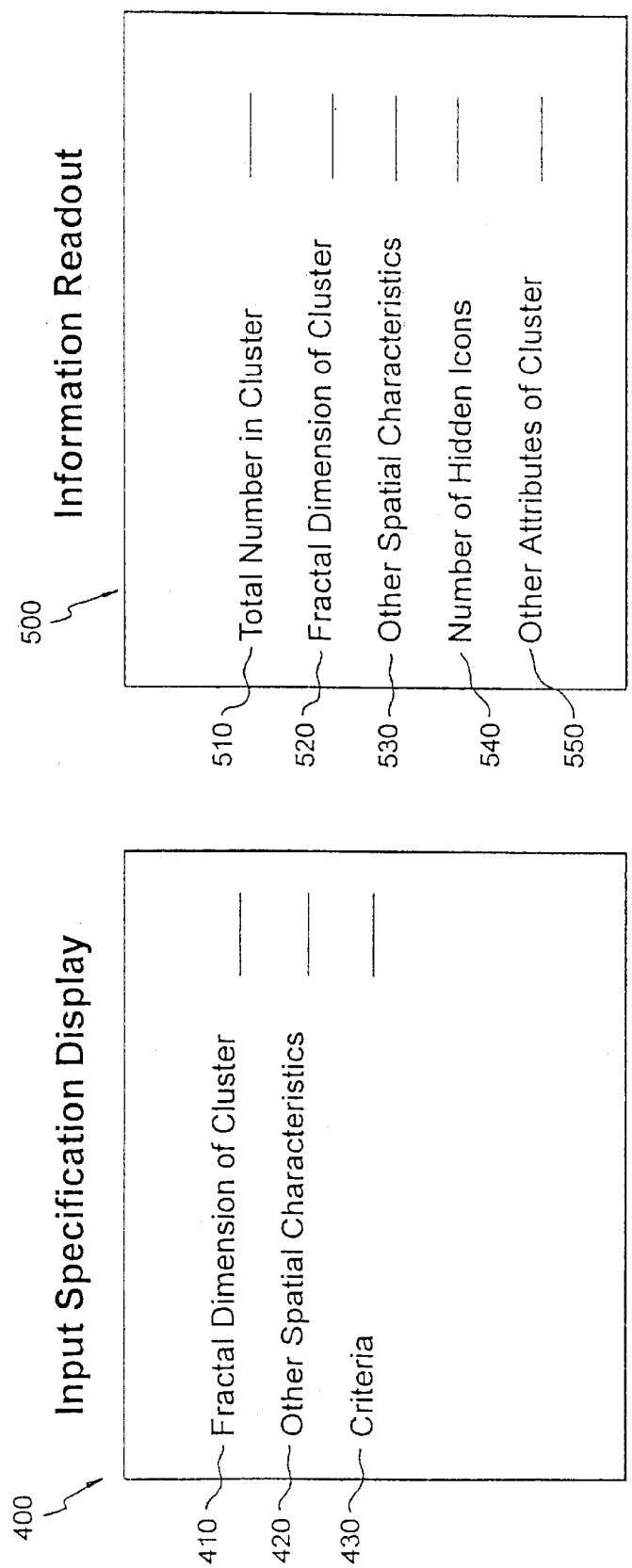
FIG. 3(a) is an interface screen display window enabling user entry of spatial dimension parameters and size adjustment criteria.
FIG. 3(b) is an interface screen display window enabling user query of factual cluster characteristics.

Alternately, users may alter the fractal dimension of an icon cluster by various means such as by entering numbers with a keyboard via a pop-up window on the GUI, or, for example, gesturing with a mouse. For example, as shown in FIG. 3(*a*), the system generates an input specification pop-up window 400 on the GUI display screen having an entry field 410 enabling a use to enter a fractal dimension of a cluster, an entry field 420 for enabling user entry of any other spatial characteristic, e.g., radius of gyration, and a field 430 enabling entry of user-specified criteria indicating how a fractal icon or icon cluster should appear, i.e., what measure of fractal dimension or spatial distribution to implement. Such criteria upon which a change in fractal dimension or spatial distribution may be based, include, for example, frequency of icon use, recency of icon use, relations between information represented by items such as icons or links, etc. Thus, the invention provides for the automatic arrangement of icons by exploiting combinations of criteria so that the icon arrangements (e.g., clusters) provide visual feedback to users on the relatedness of information represented by icons.

FIG. 4(*a*) is a flow chart depicting the methodology 20 for generating fractal icon clusters in the information presentation system of the invention. It should be understood that the methodology applies to texts and images in web-browsers and editors, as well as desk-top computer displays. As shown in FIG. 4(*a*), there is a first step 22 which represents the user's manual dragging of an icon to a location on a cluster. As an aid in the manual placement of icons within a fractal cluster, the computer's operating system may draw empty "ghost" icons in appropriate and available size positions of a cluster so that the user has a visual target to which he may drag icons. For example, these empty icons may be portrayed by a faded dotted square to which an actual icon may be dragged using a mouse (not shown). In addition, web-page links (represented by text or images) may be inserted into appropriate positions within the fractal cluster, e.g., on a web page. Next, the system may check the appropriateness of the move, and may prompt a warning to the user to ensure that a newly generated icon is "related" to the cluster to which it is being moved. As indicated at step 24, the user releases the icon, and, at step 26, the system automatically implements methods for sizing the icon given the location of the ghost icon to which it is being dragged to. Then, at step 28, the system snaps the icon at the determined size to the determined location. Alternately, as shown in FIG. 4(*a*), rather than manually dragging an icon to the location on the cluster, at step 25, the system may detect the need to add the icon to a cluster, as long as an indication is provided as to the related cluster to which it belongs. Then, the system will automatically size and snap the icon to the available location in the cluster at steps 26 and 28. It should be understood that, according to the method of FIG. 4(*a*), icons, or sets of icons, may be dragged and drop between clusters with size changes occurring automatically.

According to a preferred embodiment, the system may automatically determine the characteristics of a cluster and determine from a pre-specified criteria or combinations of criteria, how a fractal cluster should be displayed. FIG. 4(*b*) is a flow chart depicting the methodology 30 for automatically determining the characteristics of an icon cluster. As indicated at step 32, the first step requires the reading of criteria either from a file or, optionally, as indicated at step 34, from a user input, which criteria indicates how a fractal icon or icon cluster should appear, i.e., what measure of spatial distribution to implement. The criteria that may be specified includes, but is not limited to: average creation date (or other mathematical function of the creation dates) of the information represented by all icons in the cluster; average creation date (or other mathematical function of the creation dates) of the icons in the cluster; the nature of the information represented by the cluster; the number of times the information has been accessed in the cluster by the user or others (frequency of use); the last time information in the cluster was accessed (recency of use); the length of time the user, or others, spent navigating the cluster; the size of the information represented by icons in the cluster, hierarchy, and association strength between items, or other parameter characterizing the cluster. Then, given the criteria, as indicated at step 36, the system determines the characteristics of the information represented by the icons in the cluster, e.g., its creation date, or frequency of use, etc, and from that information, at step 38, determines what fractal dimension (or radius of gyration or other measure of spatial distribution) to use. Accordingly, as indicated at step 39, the system will then determine an icon's size and location within the fractal cluster. For example, if all the icons in a cluster have not been used for a long time, the fractal dimension of the cluster may automatically change which gives the cluster a different, smaller appearance to the user and potentially free up screen real-estate for other icons in clusters that are more frequently used. As a further feature of the automatic determination of cluster characteristics, for example, the depth of a sub-icon in relation to its cluster may be determined according to the criteria, e.g., recency of use, frequency of use, etc. For example, if an icon is used frequently, the system may automatically enlarge the icon and/or swap positions with other icons within the cluster, or perform some other type of cluster alteration. However, the system may query the user before taking such action. It should be understood that the operating system may automatically perform these determinations, e.g., at system boot-up or at any time, for each fractal cluster in a manner that is transparent to the user, so as to continuously maintain free space on the presentation GUI display. However, the fractal dimension characteristic of a cluster may be entirely determined by the user's preference and manual manipulation with mouse.

As mentioned, the system of the invention organizes icons, web links, text, etc. presented on a GUI so that related or relevant information is presented in a useful manner. Accordingly, relevancy may be automatically determined based upon combinations of various criteria such as the information's history of use, the content of the information, etc. Additionally, the system may automatically cluster and arrange icons and other graphical items that represent information with similar characteristics or that have some association or linkage, for example, when a user often selects one item and subsequently selects another item. As another example, the system may cluster together all items that were created on the same date, or all items related by the nature of their content, or all items not accessed for over thirty (30) days, for example.

Particularly, a relationship and strength of relationship (which may be mapped to the spatial characteristics of the cluster) may be determined from one or more factors such as: 1) the number of times the information has been accessed by the user or by others for example, a document that has been accessed more than five times in the past may be more relevant to a user's needs than a document accessed only once. Therefore, all icons representing such information may be automatically clustered together, with the size of the icon related to the number of past accesses; 2) the last time the information was accessed; 3) the time the user, or others, have spent viewing or editing the document; 4) the document's creation date; 5) the number of times the information has been forwarded to others; 6) the dates a document has been forwarded to another person and the precise nature of the person (e.g., manager, CEO, friend); 7) the reading history, including dates and durations that a document has been visible on the screen, and percentage of the document dwelled on (i.e., did the user scroll to the first page, pause there for several minutes, scroll to the next page, pause for several minutes, . . . ) The amount of total time viewing the object may be computed by calculating the time spent scrolling or by other criteria that would distinguish active viewing from simply having the information displayed on the device's screen. A heuristic algorithm may be implemented for correlating relevance with amount of time on the screen. For example, if the document stayed on the screen for hours, with no I/O activity, the document probably is not as significant as a document that is continually scrolled; and, 8) classes of words in the document. For example, the system may determine there are thirty instances of words dealing with computers, such as "printers", "diskettes", and "RAM", or there are twenty instances of words relating to animals, such as "ducks", "cows", and "geese". It should be understood that data representing factors relating to relationship and strength of relationship data is stored in a database, e.g., associated with the system 100 (FIG. 1(a)).

As described herein, the strength of association between elements may effect the clustering of graphical items that are related by the associations. High association strengths may lead to tighter clusters, and/or alter the factual dimension and size scaling relationships between many icons. The association strength is determined by a function of the characteristics of the associated pieces of information. For example, association strength $A_{12}$ representing a link or relation between information item 1 and 2 is a function of the number of times N each information item has been accessed weighted by the time since each access D so that older accesses become less important. This is quantified according to equation 1 as follows:

$$A_{12} = N_1 \times (1/D_1) \times N_2 \times (1/D_2) \tag{1}$$

Sometimes a user may access one piece of information followed immediately by another. This double access may constitute a link.

Another example of an association function is governed according to equation 2 as follows:

$$A_{12} = N_1 \times N_2 + C_1 + C_2$$

where $N_1$ is the number of times a particular individual has e-mailed the information represented by icon 1, $N_2$ is the number of times the particular individual e-mailed the information represented by icon 2, $C_1$ is the number of times computer-related words (like "RAM" and "diskette") are present in the information represented by icon 1, and $C_2$ is the number of times computer-related words (like "RAM" and "diskette") are present in the information represented by icon 2.

According to the invention, association strength may be further determined by factors such as: 1) characteristics of past link traversals, e.g., the number, frequency, and recency of traversals; 2) relationship strength of the linked information; and, 3) a mathematical relationship between the number of accesses of each of the linked units (e.g., documents) and the number of accesses and frequency of access of the link itself, therefore, taking into account the relative importance of the link with respect to the connected information.

Figure 4A:
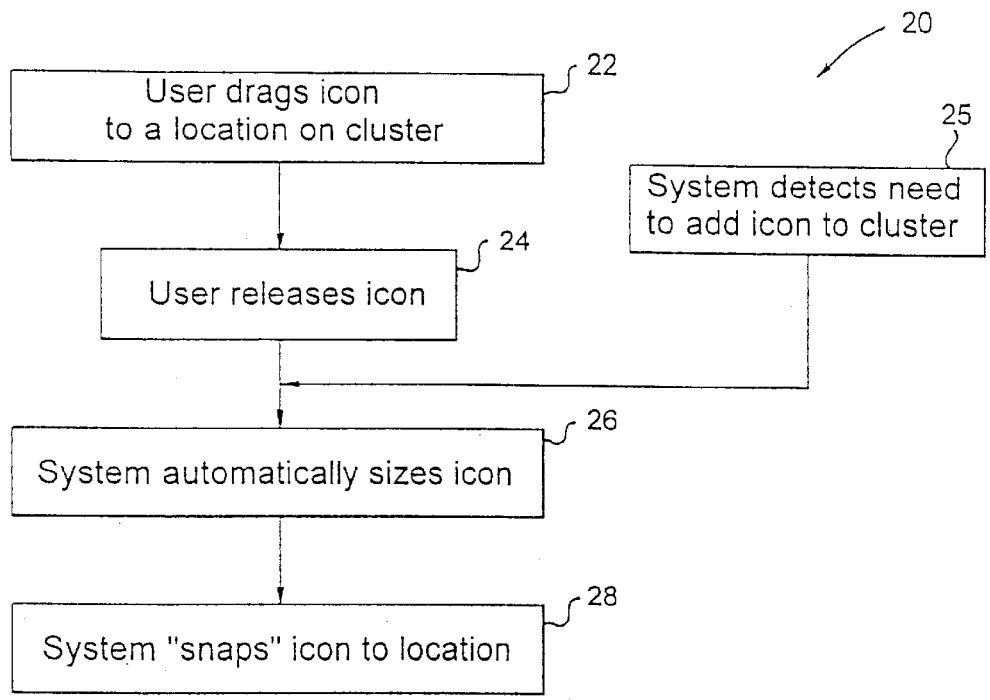
FIG. 4(a) is an illustrative flow chart depicting the method for adding an icon to a fractal cluster of the GUI of the invention.
Figure 4B:
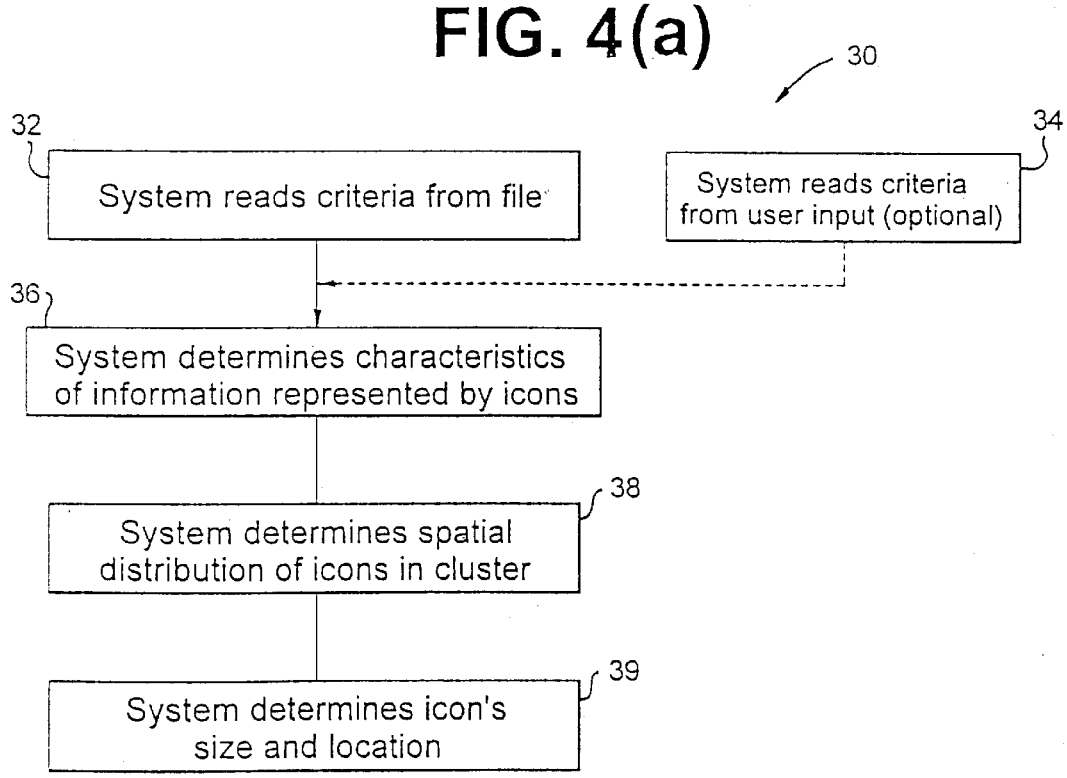
FIG. 4(b) is an illustrative flow chart depicting the method for automatically determining the characteristics of a fractal cluster.
Figure 4C:
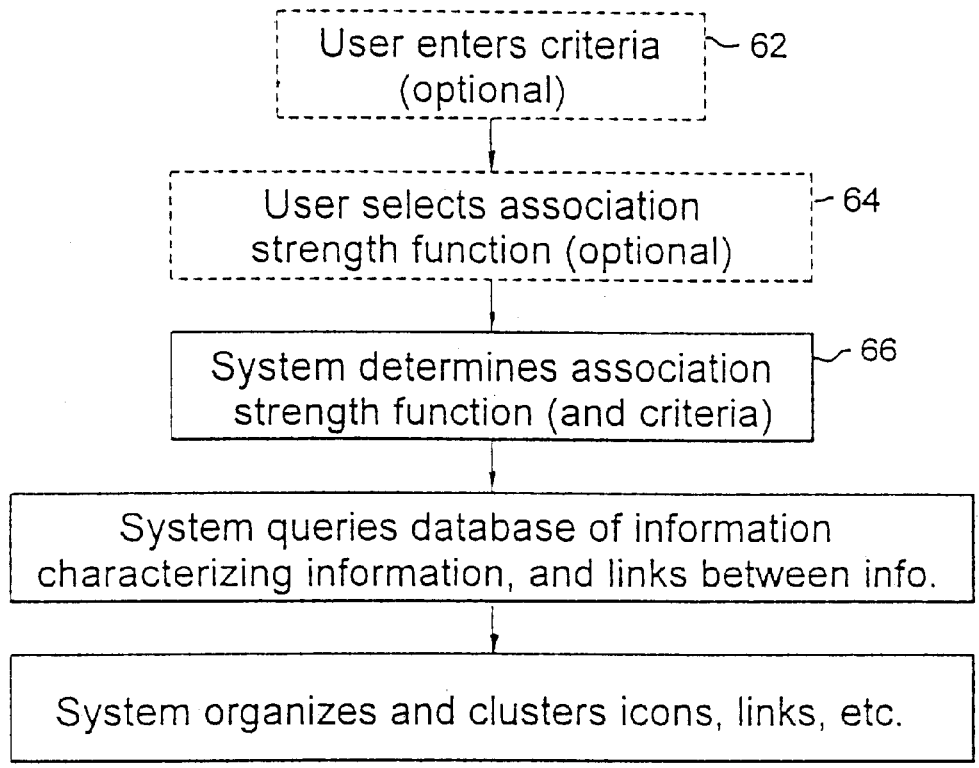
FIG. 4(c) is an illustrative flow diagram depicting the use of association strengths in determining organization and clustering of items.
Figure 4D:
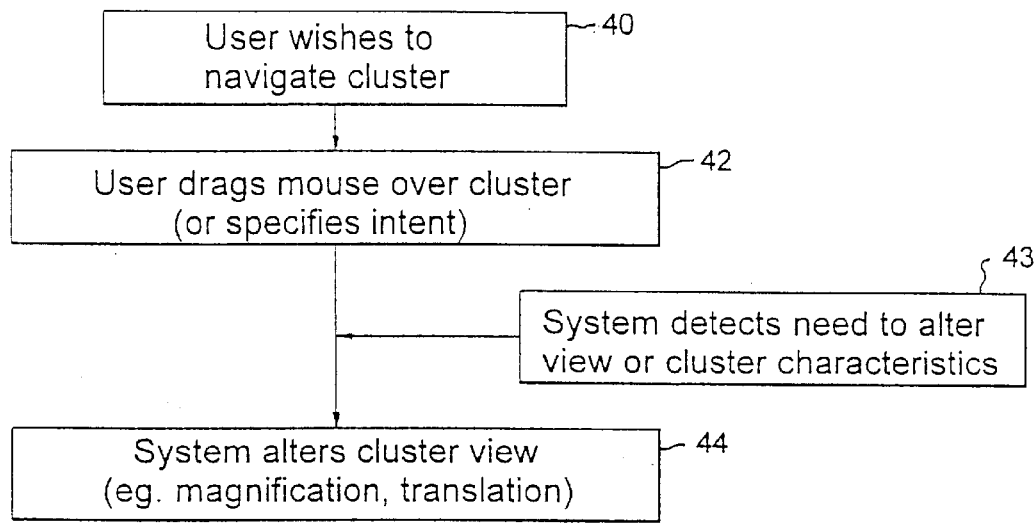
FIG. 4(d) is a flow chart depicting the method for navigating through a fractal cluster.

FIG. 4(c) is an illustrative flow diagram depicting the use of association strengths in determining organization and clustering of items. FIG. 4(c), step 62 indicates the optional step of having a user enter a strength criteria, e.g., via a pop-up display window (FIG. 3(a)), and, optional step 64 indicates a user selection of an association strength function, e.g., such as provided in equations 1) and 2) described herein, that map parameters to association strength. As indicated at step 66, the system may automatically determine the best association strength function and/or criteria to implement based on a user's history of use. For example, if an executive rarely creates a document, but is spending 90% of the time viewing documents, the system learns and does not consider parameters relevant to document alteration. The overall association strength may thus be determined using criteria supplied by the user and by criteria supplied by the system and/or some function relating the two. It should be understood that the collective behavior of many users may alter the association strength function, as well. Furthermore, the system may infer association strength functions based on user's input including a user explicitly noting that a particular document is relevant. Association strength may additionally be based on user's or users' voting. In response to the user selection (steps 62, 64) or system determination (step 66) of an association strength function, the system queries an information database for ascertaining data accumulated by the system corresponding to the relevant factors specified in the association strength function, e.g., time the user has spent viewing data, etc. Accordingly, the system organizes and clusters the graphical elements, icons, links, etc., or alters existing cluster characteristics, e.g., by changing the fractal dimension, according to the database query results.

One benefit of the use of fractal dimension is that a single parameter may be used to control and characterize the spatial arrangement of icons, windows, web-links, and text, on the display, i.e., the look (e.g. nesting) of an infinite number of sub-icons. This is because the fractal dimension characterizes the size scaling behavior of the pattern which value gives an indication of the degree to which the pattern fills the plane, and how the pattern "behaves" through different magnifications. Another parameter, the radius of gyration, "Rg," may be used to quantify the spatial extent of the icon cluster in the plane and may be computed using mathematics known to those skilled in the art. Particularly, small, compact patterns have small values of radius of gyration, while large, extended patterns have large values of radius of gyration. One other measure of spatial extent is the "standard deviation," which additionally represents the spread of data.

In the preferred embodiment, users may query various parameters regarding fractal icon clusters, for example, by moving a mouse over the cluster and clicking a mouse resulting in a display portion for reading the cluster characteristics. For example, FIGS. 1(a) and 1(b) illustrate respectively, the provision of a readout display portions 130, 230, of the GUI screen for displaying cluster parameter information. As shown in the detailed information readout display portion 500 (pop-up window) of FIG. 3(b), queryable parameters include: the number of total icons in the cluster 510; the fractal dimension of a cluster 500; the radius of gyration or other spatial characteristics 530; the number of "invisible" (hidden) icons 540; and, any other cluster attributes 550 such as: average creation date of the information represented by all icons in the cluster; average creation date of the icons in the cluster; the nature and size of the information represented by the cluster; the number of times the information has been accessed in the cluster by the user or others; the last time information in the cluster was accessed, the length of time the user, or others, spent navigating the cluster; the most likely magnification level and/or positioning needed based on past magnification and positioning experiences, a parameter specifying the rate at which the cluster has added icons through time, the names (or other identifying information) of other clusters that may be related to the current cluster being queried, suggestions for changing the cluster's spatial characteristics if there is difficulty viewing the cluster's subicons, the geographical locations and other information relating to icons that represent links to remote web pages, the predicted link access time for icons representing links to remote web pages, and any other attributes that may be used to automatically adjust the fractal dimension or other parameter controlling the spatial extent and nesting of the cluster. A user may utilize the parameter information to quickly understand how complex the cluster is without having to visualize all the sub-icons.

Furthermore, the system of the invention enables users to navigate through a cluster, e.g., in order to search out and access a desired icon, program, text, web-link, etc. In the manner depicted at steps 40 and 42 of the flow chart of FIG. 4(d), a user may navigate through a cluster, for example, by dragging a mouse over the cluster. Then, depending upon the characteristics of the cluster as automatically determined in the manner described with reference to FIG. 4(b), the system may alter the view or characteristics of the cluster, e.g., provide any magnification or translation, as indicated at step 44. As further indicated at step 43, the system may automatically detect the need to alter the view or cluster characteristics, e.g., by predicting an icon is relevant, important, or likely to be used at the current time. In response to this automatic detection, the system then automatically zooms in on a sub-icon at step 44. Thus, for example, if an icon B has been used 90% of the time after the user has selected icon A, the system may zoom in on icon B once it has detected the user has selected icon A. As another example, smaller icons may change brightness or other graphical attribute during search operations so that a user is visually guided to sub-icons of interest. Thus, in order to facilitate identification of sub-icons, sub-sub-icons, etc. during a search, for example, the system, as shown in FIG. 1(a), provides a visual display portion 140 indicating a degree of sub-icon brightening, e.g., represented as a highlighted area 141 in FIG. 1(a) . Thus, for example, if the system knows that a certain subicon is likely to be used because of a user's past history, a system-generated warning, a response to a user's query to find the icon, etc., then the system will graphically distinguish the subicon by changing its brightness, blinking, color, intensity, size, shape or other graphical characteristic, etc. all to facilitate searching of the icon on the GUI. In a virtual reality system, the icon may also change its tactile and audio characteristics such as temperature, malleability, squashiness, squeakiness, sound-emission, etc. Additionally, if desired, the fractal cluster may be moved as a unit using the mouse so that all sub-icons move together.

Figure 4E:
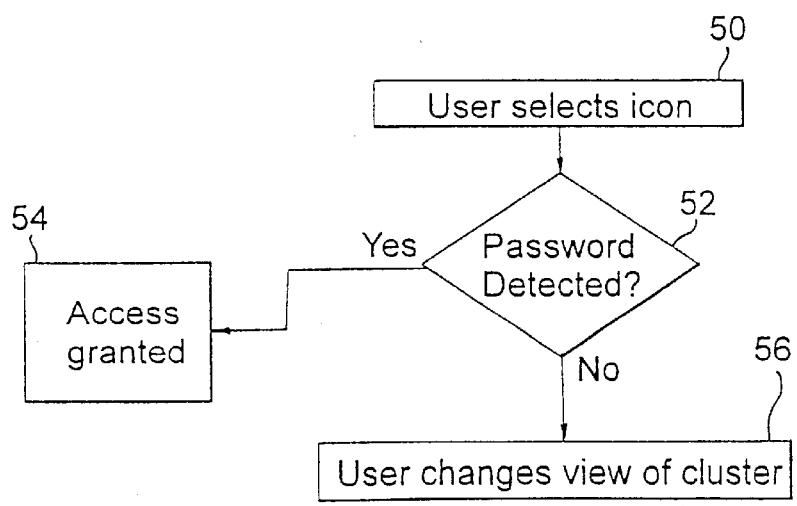
FIG. 4(e) is a flow chart depicting the password protection mechanism implemented in the system of the invention.

As part of the system navigation, the system may implement a password protection mechanism restricting access to restricted functions (such as access to the desktop, software, data . . . ) represented in the cluster. Passwords may consist of selecting or dragging a plurality of icons across different size scales. In order to enter the "fractal password", the user may have to magnify regions of the cluster in order to select smaller icons thus, enhancing security. Thus, a password may comprise implementing steps such as selecting a large icon, then zooming to an icon not initially visible, then selecting this tiny icon, then demagnifying the cluster to select another icon, which is then dragged to another icon in the cluster or another cluster. This entire sequence of selecting, zooming, dragging, etc., provides a secure password that would be hard to detect, for example, by someone casually observing a user entering the password. As an example, if the user remembered that a red icon should be selected next in a sequence, the user may also remember where to look for it (e.g., it may be invisible in the current view) whereas an observer may have difficulty searching though a plurality of subicons. This would be akin to a user remembering positions on a local street map that would be hard for a stranger, unfamiliar with the local area, to remember. The invisibility of certain elements of the password enhance its security as does the dragging of elements across size scales. FIG. 4(e) illustrates a fractal password security mechanism implemented in the system of the invention. As shown in FIG. 4(e), at step 50, the user may select an icon from a fractal cluster, and, at step 52, the system determines if the user is so authorized to continue. If the user is so authorized, i.e., the user's password is detected, as shown at step 54, then the user is granted access to the selected item. Otherwise, the user may change the view of the cluster, at step 56, for example, in order to select another icon. The process may be repeated until the correct combination of steps are performed in satisfaction of the authorization requirement.

Increasingly, users are provided with computer and computing devices that enables input via a pen device, with some devices allowing users to write on touch-sensitive screens. Still other devices like the CrossPad, for example, may be used for annotation using an ordinary pen on paper. This motivates the need for improved systems and means for organizing and annotating documents on pen-based computers, in addition to computers/computing devices equipped with alphanumeric keyboard entry.

Figure 5:
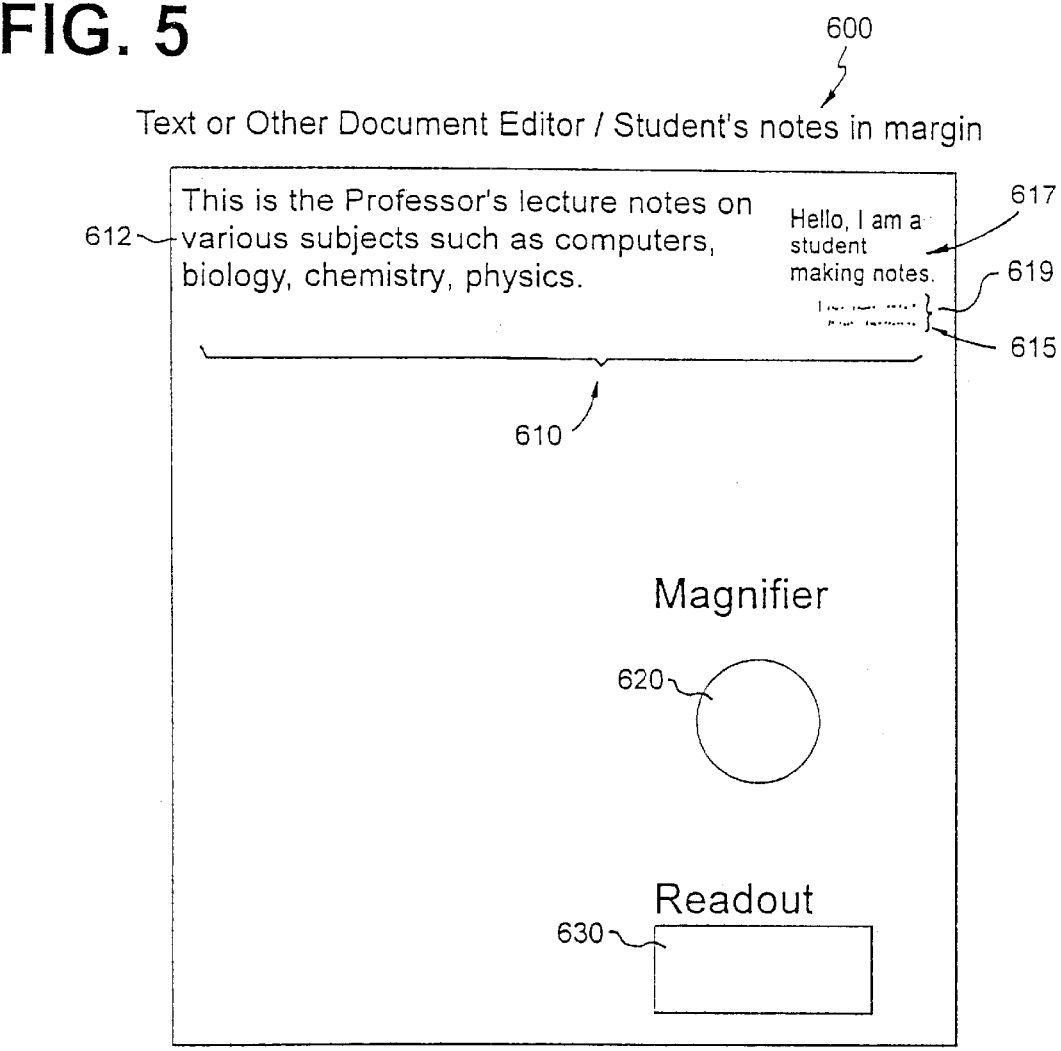
FIG. 5 illustrates a "fractal text" arrangement comprising a set of one or more pieces of text at different sizes on a text editor screen display.

FIG. 5 illustrates the window 600 of a text editor or other text/diagram display. Often it is useful to annotate text or other documents using pen-based input (such as provided by a CrossPad coupled to a notebook computer or numerous portable devices that permit users to use a stylus directly on an LCD display) or by using a standard keyboard. However, one problem is that there may be little space in the margins (or other areas) of a document to add annotation. According to the invention, a "multiple-resolution annotation" function is provided that enables users to add information (text, images, handwritten diagrams) at smaller size scales, to a text document. FIG. 5 illustrates such a "fractal text" arrangement comprising a set 610 of one or more pieces of text at different sizes. As shown in FIG. 5, the main text area 612 is normal-sized, whereas other multiresolution text 615 appears in diminishing sizes. Thus, in an example scenario, a science professor may provide a first set of typed lecture notes in the main text area 612 for students which may be displayed on a student's computer display 600. A student may annotate the text using a pen-based system in which the annotation 617 is made at a smaller-size scale. The user may magnify the margin before adding the annotation. Additional annotations 619 may be made at ever diminishing size scales, and the spatial relations between the microannotations may suggest a relatedness to the larger annotations. Text size may also be used to automatically indicate creation date, hierarchy, frequency of use or other parameter—or the size may be entirely determined by the user's preference. For example, a user may wish to place more frequently read text in a larger size. Less read text may be positioned at smaller sizes. If the text is annotated by multiple users, each user may add text at a different size scale.

In order to access and see smaller text, the user may magnify regions of the document display using a variety of means such as by dragging the mouse (not shown) over the region to be magnified. Alternatively, the magnifier icon 620 such as shown in FIG. 5, may be dragged over a region of the text to reveal smaller text. The degree of magnification may be specified by numeric, mouse-gestural, graphical slider, or other means. With this approach the degree of text nesting can be quite deep. The computer may automatically enlarge text based on predicted needs of the user or by other criteria. If a user searches for a particular text string, the system may automatically enlarge the smaller text, if necessary, for readability. As shown in FIG. 5, a readout display portion 630 may be provided to inform the user about various characteristics of the multiresolution text (nesting, creation date, etc.) in a manner analogous to that already described for FIG. 3(b) for icons.

As mentioned herein, a benefit of the fractal text arrangement as shown in FIG. 5, is that the user never runs out of document space, as smaller and smaller text may be used as needed. Moreover, a user may quickly (spatially) cluster text and understand relationships between text. As described herein, the density and degree to which the text changes size relative to the larger text may be controlled by a fractal dimension parameter. Users may query various parameters regarding the text cluster, for example, by moving a mouse over the cluster and clicking a mouse button. As in the case of the desktop and webtop shown respectively in FIGS. 1(a) and 1(b), queryable parameters include: the fractal dimension, radius of gyration, number of "invisible" text words, and number of total text pieces in the cluster. In this manner, a user may quickly understand how complex the text cluster is. If desired, the fractal cluster may be moved as a unit using the mouse so that all sub-text moves together. This is an additional advantage of using multiresolution text over prior art where many pieces of text cannot be spatially close to one another.

As in the case of the computer web-top/desktop described herein with respect to FIGS. 4(a)–4(b), the computer system may determine what fractal dimension (or radius of gyration or other measure of spatial distribution) to use based on criteria such as: the average text cluster creation date, hierarchy, frequency of viewing, recency of use, size of information represented by the microtext, or other parameter characterizing the cluster—or the dimension may be entirely determined by the user's preference and manual manipulation with mouse. For example, if all the text in a cluster has not been viewed for a long time, the fractal dimension of the cluster may automatically change which gives the cluster a different appearance to the user and potentially an efficient way to free up screen display real-estate for text in other clusters that are more frequently used. For example, a low fractal dimension may visually appear as a diffuse collection of text while a high fractal dimension would visually correspond to a denser, more highly nested cluster.

In order to aid in the manual placement of text within a fractal cluster, the operating system may draw empty "ghost" regions in appropriate positions so that the user has a visual target to which he may drag text. For example, these empty regions may be portrayed by a faded dotted square to which an actual text may be dragged using a mouse.

Figure 6:
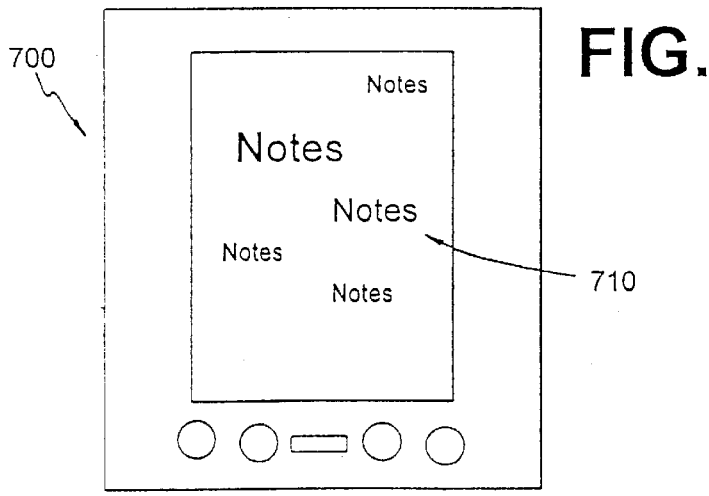
FIG. 6 illustrates a display of a portable hand-held computer device enabling multiresolution annotations of text by a pen input device.

As described herein with reference to the desktop/webtop applications, the users may alter the fractal dimension of text clusters by various means such as by inputting numbers, gesturing with a mouse, or manipulation a graphical slider. Alternatively, the computer system may adjust this parameter, as needed to conserve space, suggest relations, or improve user interactions. Thus, the invention has particular relevance to smaller devices, such as pervasive lap/palm-top computer and other hand-held computer devices having pen-based or keyboard based inputs, because available screen real estate is at a premium. For example, as shown in FIG. 6, the invention may be implemented to provide a text multiresolution annotation feature 710 for portable and lap/palm-top computer device displays 700.

This invention may also be useful on low-resolution displays such as TVS and kiosks, in which the ability to condense information into magnifyable clusters would help advertisers, system programmers, and users to accommodate a lot of information on a limited display.

The present invention is capable of running on any general purpose computer system or computer controlled GUI (e.g., a television or virtual reality system), including GUIs that have the ability to present multimedia and/or virtual reality information. As shown in FIG. 1(a), a computer system 100 comprises a central processing unit (CPU) 101, memory storage device 103, one or more monitors or graphical interfaces 102, and selection device such as a mouse 107 or speech recognition system (not shown). In one embodiment, the computer system may comprise a IBM RISC SYSTEM/6000. The mouse 107 may be used to select GUI objects 110, like icons 115. On an IBM RISC System/6000, multiple monitors may be controlled by multiple monitor adaptor cards (not shown) such as the IBM RISC System/6000 Color Graphics Display Adaptor. The computer system 100 may also have audio input/output capability, e.g., by implementing an ActionMedia II Display Adaptor (not shown) as described in the IBM ActionMedia II Technical Reference which provides for audio/video playback. This adaptor may also be used to display TV broadcasts/signals, e.g. "picture-in-picture" of TV broadcasts, and other full motion video and sound audio/visual on the monitors.

In addition, speech synthesis or speech recognition capability (not shown) may be provided, in the form of an IBM VoiceType Dictation Adaptor, for example.

Alternately, the CPU 101 may be connected via a network adaptor (not shown) to connect the system 100 to a network. Network adaptors are well known and may include, for example, token ring adaptors, ethernet adaptors, and modems. The system 100 may be connected to other target monitors through a client/server network (or LAN add number).

Systems that may be used to display graphical images, like icons and windows, are well known. Thus, GUIs may be used to control any apparatus having a monitor. In the field of television (TV), channel selection may be performed by selecting an icon consisting of the animated video broadcast on a given channel frequency.

While the invention has been particularly shown and described with respect to illustrative and preformed embodiments thereof, it will be understood by those skilled in the art that the foregoing and other changes in form and detail may be made therein without departing from the spirit and scope of the invention which should be limited only by the scope of the appended claims.

Having thus described our invention, what we claim as new, and desire to secure the Letters Patent is:

1. An information presentation system comprising:
 a) computer system including display terminal for providing a graphical user interface (GUI);
 b) means for generating a cluster of items comprising graphical or textual elements for display via said GUI size scales, each item in a cluster representing information having a degree of relatedness with information represented by other items in said cluster; and
 c) means for automatically controlling the spatial extent of and arrangement of items within a cluster according to a specified criteria via said GUI, which spatial extent and arrangement is controlled to provide optimal display and conserve screen display space on said display terminal.

2. The system according to claim 1, wherein a cluster is generated according to a fractal arrangement, said spatial extent and arrangement of items being controlled according to relatedness of information represented by said cluster items.

3. The system according to claim 2, wherein said spatial cluster includes icons representing text, said generating means enabling generation of multi-resolution annotations, including when said multi-resolution annotations are performed with pervasive computing style inputs, comprising textual information according to a fractal appearance.

4. The system according to claim 1, wherein said means for controlling includes means for entering said specified criteria via said GUI.

5. The system according to claim 4, wherein said specified criteria comprises a single spatial determination parameter for indicating said spatial extent of a cluster to be displayed.

6. The system according to claim 5, wherein said spatial determination parameter includes a fractal dimension for said cluster, said fractal dimension determining a size scaling behavior of said cluster.

7. The system according to claim 5, wherein said spatial determination parameter includes a radius of gyration for qualifying spatial extent of a cluster.

8. The system according to claim 4, wherein said predetermined criteria includes an average creation date of information represented by items included in said cluster.

9. The system according to claim 4, wherein said predetermined criteria includes a frequency of use of items in said cluster.

10. The system according to claim 4, wherein said predetermined criteria includes a determination of how recent an item in said cluster was accessed.

11. The system according to claim 4, wherein said predetermined criteria includes a function specifying factors defining an association strength between items in a cluster, said system including means for accumulating data relating to factors specified in said association strength function.

12. The system according to claim 11, wherein a factor includes determination of how recent an item in said cluster was accessed.

13. The system according to claim 4, wherein an item represents an element selected from the group consisting of text, and web-links, data, programs and information represented by iconic graphical elements.

14. The system according to claim 4, further including means for querying a value of said spatial determination parameter via said GUI.

15. The system according to claim 4, further including means for indicating via said GUI locations at or near a cluster where newly created items may be included.

16. The system according to claim 4, further including means for magnifying fractal item clusters for facilitating user viewing of spatially dense clusters scaled down in size.

17. The system according to claim 4, wherein said generating means includes means for automatically determining a depth of an icon in relation to a cluster, and initiating enlargement of an icon based on use of said icon.

18. The system according to claim 4, wherein said generating means includes means for automatically initiating exchange of a position of a first icon with another icon based on use of said first icon.

19. The system according to claim 4, The system according to claim 3, further including a password protection mechanism requiring a user to select one or more pre-determined items included within one or more clusters, change a magnification of a cluster, and perform one of manipulating said selected item for placement in a cluster at a different size scale, or selecting another item in a cluster at a different size scale without manipulating said selected item.

20. The system according to claim 1, wherein said computer system supports web browser for www connectivity, said spatial cluster including icons representing a web-page link.

21. Method for presenting information on a computer display device comprising the steps of:
   a) generating a cluster of items comprising graphical or textual elements for display via a GUI each item in a cluster representing information having a degree of relatedness with information represented by other items in said cluster; and
   b) accessing criteria for automatically controlling a spatial extent and arrangement of items within a cluster; and
   c) automatically controlling the spatial extent of and arrangement of items within a cluster according to said accessed criteria, which spatial extent and arrangement is controlled to provide optimal display and conserve screen display space on said display terminal.

22. The method according to claim 21, wherein prior to said generating step, a step of indicating via said GUI one or more potential locations for receiving one or more items to be organized within a said cluster.

23. The method according to claim 21, further including controlling said spatial extent and arrangement of items in a cluster according to relatedness of information represented by said items.

24. The method according to claim 23, wherein said controlling step includes step of entering said specified criteria via said GUI.

25. The method according to claim 24, wherein said criteria comprises a single spatial determination parameter for indicating said spatial extent of a cluster to be displayed.

26. The method according to claim 24, wherein said criteria includes an average creation date of information represented by items included in said cluster.

27. The method according to claim 24, wherein said criteria includes a frequency of use of items in said cluster.

28. The method according to claim 24, wherein said criteria includes a determination of how recent an item in said cluster was accessed.

29. The method according to claim 24, wherein said criteria includes a function specifying factors defining an association strength between items in a cluster, said method further including step of accumulating data relating to factors specified in said association strength function, and storing said data in a memory storage device.

30. The method according to claim 29, wherein a factor includes determination of how recent an item in said cluster was accessed.

31. The method according to claim 29, wherein said accessing step further includes querying said memory storage device for ascertaining accumulated data of factors specified in said association strength function.

32. The method according to claim 23, further including the step of enabling user requests of criteria implemented for controlling said spatial cluster via said GUI, and displaying said criteria via said GUI.

33. The method according to claim 23, further including the step of magnifying said clusters in said GUI to generate display of items at different fractal dimensions.

34. The method according to claim 23, wherein said generating step further includes the step of automatically determining a depth of an icon in relation to a cluster, and initiating enlargement of an icon based on use of said icon.

35. The method according to claim 23, further including the step of implementing a password protection mechanism requiring a user to select one or more pre-determined items included within one or more clusters, change a magnification of a cluster, and perform one of manipulating said selected item for placement in a cluster at a different size scale, or selecting another item in a cluster at a different size scale without manipulating said selected item.

36. The method according to claim 23, further including the step of enabling generation of multi-resolution annotations in a document to be displayed, said multi-resolution annotations comprising textual information according to a fractal appearance.

37. A program storage device readable by a machine, tangibly embodying a program of instructions executable by the machine to perform method steps for presenting information on a computer display device presenting a graphical user interface (GUI), said method steps comprising:
   a) generating a cluster of items comprising graphical or textual elements for display via a GUI each item in a cluster representing information having a degree of relatedness with information represented by other items in said cluster; and
   b) accessing criteria for automatically controlling a spatial extent and arrangement of items within a cluster; and
   c) automatically controlling the spatial extent of and arrangement of items within a cluster according to said accessed criteria, which spatial extent and arrangement is automatically controlled to provide optimal display and conserve screen display space on said display terminal.

38. The program storage device readable by a machine according to claim 37, wherein prior to said generating step, a step of indicating via said GUI one or more potential locations for receiving one or more items to be organized within a said cluster.

39. The program storage device readable by a machine according to claim 38, wherein said criteria comprises a single spatial determination parameter for indicating said spatial extent of a cluster to be displayed.

40. The program storage device readable by a machine according to claim 37, further including controlling said spatial extent and arrangement of items in a cluster according to relatedness of information represented by said items.

41. The program storage device readable by a machine according to claim 37, wherein said controlling step includes step of entering said specified criteria via said GUI.

42. The program storage device readable by a machine according to claim 41, wherein said criteria includes an average creation date of information represented by items included in said cluster.

43. The program storage device readable by a machine according to claim 41, wherein said criteria includes a frequency of use of items in said cluster.

44. The program storage device readable by a machine according to claim 41, wherein said criteria includes a determination of how recent an item in said cluster was accessed.

45. The program storage device readable by a machine according to claim 41, wherein said criteria includes a function specifying factors defining an association strength between items in a cluster, said method further including step of accumulating data relating to factors specified in said association strength function, and storing said data in a memory storage device.

46. The program storage device readable by a machine according to claim 41, wherein a factor includes determination of how recent an item in said cluster was accessed.

47. The program storage device readable by a machine according to claim 41, wherein said accessing step further includes querying said memory storage device for ascertaining accumulated data of factors specified in said association strength function.

48. The program storage device readable by a machine according to claim 41, further including the step of enabling user requests of criteria implemented for controlling said spatial cluster via said GUI, and displaying said criteria via said GUI.

* * * * *

UNITED STATES PATENT AND TRADEMARK OFFICE
CERTIFICATE OF CORRECTION

PATENT NO.      : 6,426,761 B1                                    Page 1 of 1
DATED           : July 30, 2002
INVENTOR(S)     : Dimitri Kanevsky et al.

It is certified that error appears in the above-identified patent and that said Letters Patent is hereby corrected as shown below:

<u>Title page,</u>
Item [56], References Cited, U.S. PATENT DOCUMENTS,
"6,262,597" should read -- 6,252,597 --

<u>Column 1,</u>
Line 40, "GUT" should read -- GUI --

Signed and Sealed this

Second Day of December, 2003

JAMES E. ROGAN
*Director of the United States Patent and Trademark Office*